(12) United States Patent
Lewis et al.

(10) Patent No.: US 12,545,407 B2
(45) Date of Patent: Feb. 10, 2026

(54) SYSTEM AND METHOD FOR MULTIPLE LIQUID SAMPLE CAPTURE FROM AERIAL DRONES

(71) Applicant: WILL LEWIS CONSULTING, LLC, Claymont, DE (US)

(72) Inventors: William H. Lewis, Claymont, DE (US); Thomas S. Lloyd, Auckland (NZ)

(73) Assignee: WILL LEWIS CONSULTING, LLC, Claymont, DE (US)

( * ) Notice: Subject to any disclaimer, the term of this patent is extended or adjusted under 35 U.S.C. 154(b) by 219 days.

(21) Appl. No.: 18/026,776

(22) PCT Filed: Sep. 28, 2021

(86) PCT No.: PCT/US2021/052427
§ 371 (c)(1),
(2) Date: Mar. 16, 2023

(87) PCT Pub. No.: WO2022/072357
PCT Pub. Date: Apr. 7, 2022

(65) Prior Publication Data
US 2023/0373625 A1    Nov. 23, 2023

Related U.S. Application Data

(60) Provisional application No. 63/085,540, filed on Sep. 30, 2020.

(51) Int. Cl.
*G01N 1/12*     (2006.01)
*B64D 1/22*     (2006.01)
(Continued)

(52) U.S. Cl.
CPC ............... *B64D 1/22* (2013.01); *B64U 10/13* (2023.01); *G01N 1/10* (2013.01); *G01N 33/18* (2013.01);
(Continued)

(58) Field of Classification Search
None
See application file for complete search history.

(56) References Cited

U.S. PATENT DOCUMENTS 5,094,113 A * 3/1992 Wood ....................... G01N 1/12
73/864.67
2017/0328814 A1* 11/2017 Castendyk ............... B64D 1/22

FOREIGN PATENT DOCUMENTS

CN    105606400 A    5/2016
CN    206634205 U    11/2017
(Continued)

OTHER PUBLICATIONS

English Translation of CN 111721579 (Year: 2020).*
(Continued)

*Primary Examiner* — Alexander A Mercado
(74) *Attorney, Agent, or Firm* — Carlos R. Villamar; The Villamar Firm PLLC

(57) ABSTRACT

A system, and method for capture of multiple liquid samples from an aerial drone, including an aerial drone; one or more liquid sample receptacles disposed within respective receptacle containing units provided on the aerial drone; and a gear drive mechanism configured to lower and raise the one or more liquid sample receptacles and the respective receptacle containing units into a body of liquid to capture multiple liquid samples from the body of liquid.

10 Claims, 11 Drawing Sheets

(51) Int. Cl.
*B64U 10/13* (2023.01)
*G01N 1/10* (2006.01)
*G01N 33/18* (2006.01)
*B64U 101/35* (2023.01)
*B64U 101/67* (2023.01)

(52) U.S. Cl.
CPC ...... *B64U 2101/35* (2023.01); *B64U 2101/67* (2023.01)

(56) References Cited

FOREIGN PATENT DOCUMENTS

| CN | 105699125 B | 10/2018 |
|---|---|---|
| CN | 108609178 A | 10/2018 |
| CN | 108613841 A | 10/2018 |
| CN | 110244012 A | 9/2019 |
| CN | 110672371 A | 1/2020 |
| CN | 111551401 A | 8/2020 |
| CN | 111721579 A | 9/2020 |
| EP | 2584355 A1 | 4/2013 |
| EP | 2584355 B1 | 9/2015 |
| EP | 3112840 A1 | 1/2017 |
| KR | 20160097399 A | 8/2016 |

OTHER PUBLICATIONS

PCT ISR and WO Ser. No. PCT/US21/52427 dated Jan. 18, 2022 (Jan. 18, 2022).
Koparan et al. "Adaptive Water Sampling Device for Aerial Robots;" Feb. 6, 2020 (Feb. 6, 2020) retrieved from <URL: https://res.mdpi.com/d_attachment/drones/drones-04-00005/article_deploy/drones-04-00005-v2.pdf>.
Supplementary European Search Report App. No. EP 21 87 6304; Jul. 24, 2024 (Jul. 24, 2024).

\* cited by examiner

FIG.3     MULTIPLE LIQUID SAMPLE CAPTURE (MLSC) SYSTEM (EXPLODED) 300

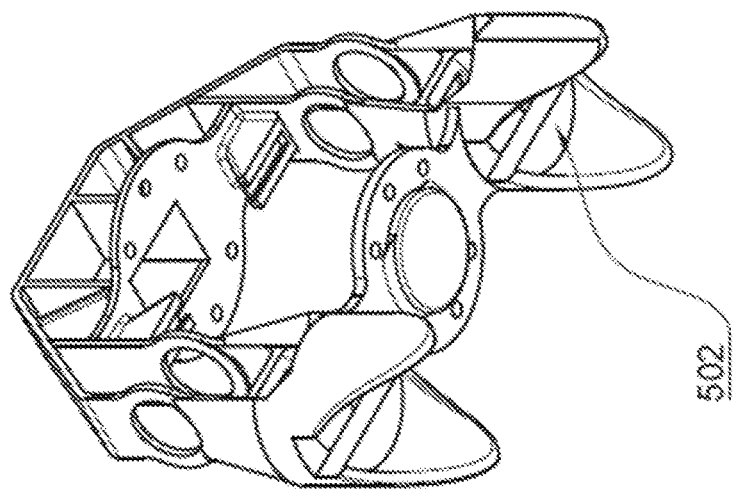
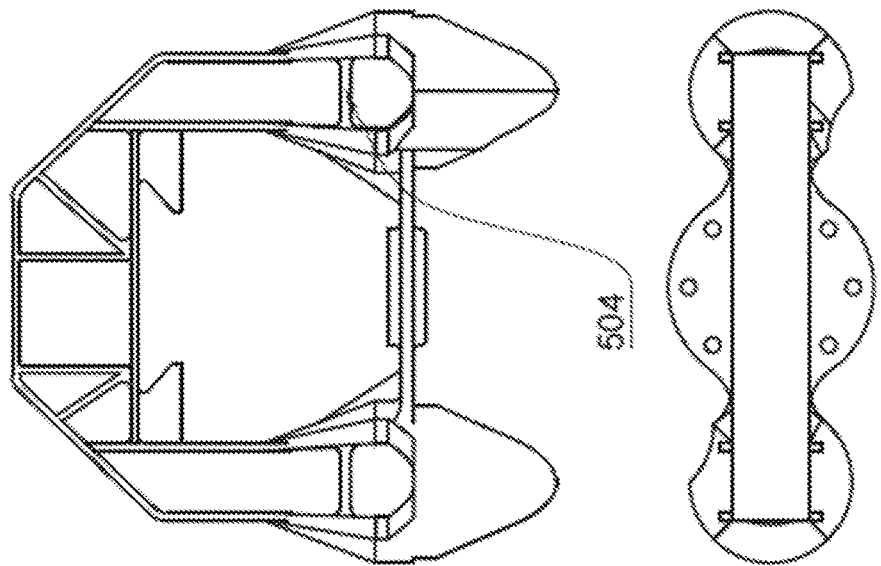
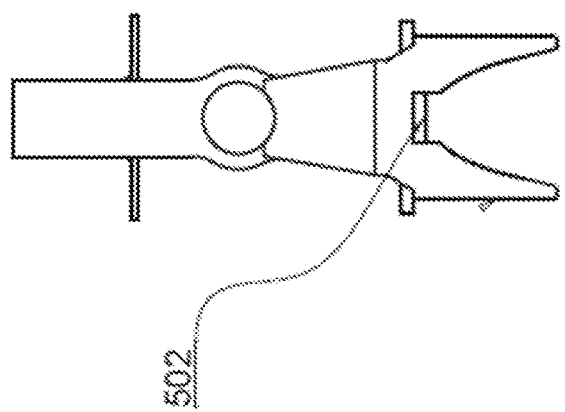
FIG. 5

SYSTEM AND METHOD FOR MULTIPLE LIQUID SAMPLE CAPTURE FROM AERIAL DRONES

CROSS REFERENCE TO RELATED DOCUMENTS

The present disclosure claims priority to U.S. Provisional Patent Application Ser. No. 63/085,540 of William H. LEWIS et al., entitled "SYSTEM AND METHOD FOR MULTIPLE LIQUID SAMPLE CAPTURE FROM AERIAL DRONES," filed on 30 Sep. 2020, the entire disclosure of which is hereby incorporated by reference herein.

BACKGROUND OF THE INVENTION

Field of the Invention

The present invention generally relates to liquid sample capture systems and methods, and more particularly to liquid sample capture systems and methods employing aerial drones, and the like.

Discussion of the Background

In recent years, sample capture systems and methods have been developed. However, such systems and methods lack precision and efficiency with respect to liquid sample capture employing aerial drones, and the like.

SUMMARY OF THE INVENTION

Therefore, there is a need for a system and subsequent method that addresses the above and other problems. The above and other problems are addressed by the illustrative embodiments of the present invention, which is capable of collecting water or other liquid samples more efficiently than current methods by increasing the number of samples collected per unit time and reducing operational dependencies such as the number of teams or technicians required while ensuring that sampling is conducted in a manner consistent with best practices, cross-contamination between sites is limited, and data quality standards are met. This system and method for multiple liquid sample capture (MLSC) using an aerial drone consists of an array of one or more sample capture units (SCU), receptacles protected by orifice covers and/or external housings or shrouds, that can be deployed independently from a dock attached to the aerial drone via a winch mechanism at desired sampling locations and sampling times. When triggered, one or more SCUs drop from the aerial drone to collect a water or other liquid sample before returning to the protected housing or shroud and closing orifice covers. The aerial drone can then travel to another location and deploy additional SCUs to take water or other liquid samples based on the volume requirements and payload limitations of the platform without exposing previously collected sample(s) to cross-contamination during sampling or transit to and between sampling locations and a home base. The SCUs are interchangeable with one or more compatible end effectors such as sensors or sensor packages capable of characterizing liquid conditions (e.g., nitrate, nitrites, ammonia, pH, temperature, chlorophyll, microbial DNA densities, microplastics, dissolved oxygen, turbidity, chlorine, spectral analysis, etc.).

Accordingly, in illustrative aspects of the present invention there is provided a system, and method for capture of multiple liquid samples from an aerial drone, including an aerial drone; one or more liquid sample receptacles disposed within respective receptacle containing units provided on the aerial drone; and a gear drive mechanism configured to lower and raise the one or more liquid sample receptacles and the respective receptacle containing units into a body of liquid to capture multiple liquid samples from the body of liquid.

The gear drive mechanism further includes a structure comprising a core removably attached to the aerial drone; and one or more docks attached to the core and configured to hold the respective receptacle containing units.

The gear drive mechanism further includes an actuation system configured for lowering and raising the one or more liquid sample receptacles and the respective receptacle containing units.

The system, and method further include an external housing configured to protect the one or more liquid sample receptacles and the respective receptacle containing units from cross-contamination.

The respective receptacle containing units include respective open and closable orifice covers for preventing unwanted ingress of liquids or gasses into the respective receptacle containing units.

The respective receptacle containing units include respective open and closable receptacle lid closure mechanisms for preventing unwanted ingress of liquids or gasses into the respective receptacles of the receptacle containing units.

The system, and method further include one or more end effectors, including sensors, or sensor packages coupled to the aerial drone by an attachment cable.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 5 is an illustrative representation of a dock system component that holds sample capture units (SCU) or end effectors securely in place at a docking point when not deployed;

DETAILED DESCRIPTION OF THE PREFERRED EMBODIMENTS

The present invention includes recognition that current efforts to collect surface water samples from marine or inland water bodies involve teams manually collecting samples from slow moving boats, docks, or the shoreline. Teams of two or more technicians are typically required to carry out sampling using best practices to limit the chances of cross-contamination between sites and ensure that data quality standards are met. Sampling programs developed using current best practices typically result in very high cost per sample collected given the number of teams involved and travel between locations translating to limited sampling over both space and time. A small number of academic and commercial entities have retrofitted aerial drones to collect water samples in an effort to increase sampling efficiency and reduce travel time between locations. However, these existing aerial drone water sampling retrofit designs have not been developed from the perspective of sampling best practices to meet data quality standards and allow for hardware to come into contact with the water surface at multiple sampling locations leading to cross-contamination between sites.

Generally, the described method and system include an actuation system capable of deploying one or more receptacles or receptacle containing units to collect samples of a liquid. A mechanism is provided to lower and/or raise one or more receptacles or receptacle containing units at a time when activated. An orifice cover or lid for a receptacle or receptacle containing unit allows for the release of a gas and passive filling of a liquid. The orifice cover or lid for a receptacle or receptacle containing unit prevents the ingress of a gas or liquid unless opened and deployed. A receptacle lid closure and seal protect receptacle orifices or pathways for filling from cross-contamination during ground transport, aerial drone flight, or liquid capture at other sites. An external housing or shroud is employed to limit the potential for cross-contamination during ground transport, aerial drone flight, or liquid capture at other sites. Handling logic for multiple liquid sampling receptacles and subsystems are provided so as to deploy and collect discrete liquid samples, while seeking to avoid cross-contamination, as well as the deployment and re-use steps inherent in the design. A source to test multiple liquid sample capture (MLSC) retrofit hardware, software, and service architecture is provided enabling efficient interfacing with third party aerial drone solutions as well as control of deployment/docking hardware through embedded system radio control and drive system processes.

Figure 1:
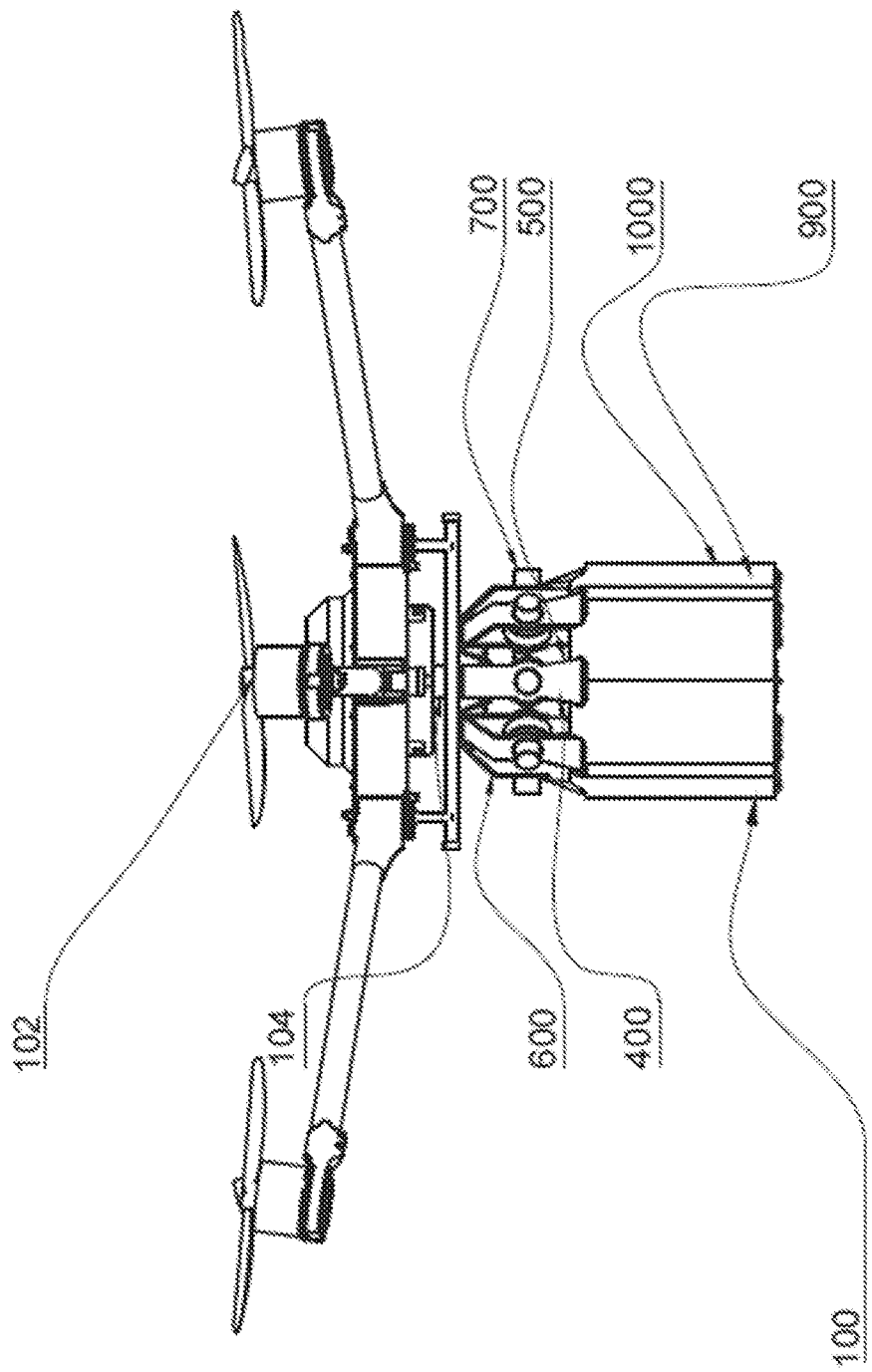
FIG. 1 is an illustrative representation of a multiple liquid sample capture (MLSC) system in transit state.

Referring now to the drawings, wherein like reference numerals designate identical or corresponding parts throughout the several views, and more particularly to FIG. 1 thereof, there is shown an illustrative representation of a multiple liquid sample capture (MLSC) system in transit state. In FIG. 1, the multiple liquid sample capture (MLSC) system 100 includes auxiliary subsystems such as the core 400, dock 500, detachable docks 600, sprung winch spools (SWS) 700, shrouds 900, and sample capture units (SCU) 1000. The MLSC system 100 is capable of passively capturing liquid samples through submersion or other non-mechanical means (e.g., gear driven, mechanical actuator driven, magnetic driven, etc.) at chosen sample sites from a maintained above liquid surface state. The system does this by utilizing lift generated by a computer controlled aerial drone 102 with dynamic, controlled actuation by an operator or autonomous agent. The lift capabilities of aerial drone 102 enables the MLSC system 100 to be flown on a safe path to an initial liquid sampling site, passively collect one or more samples at a site or location through the submersion or other non-mechanical means, and then be returned safely to a position of choice. The propulsion system of the aerial drone 102 enables the spatial translation of the system shown in FIG. 1 from a base, to one or more sample sites and then again back to a base. The MLSC system 100 will be in transit state as shown in FIG. 1 with all sample receptacles 1106 or end effectors protected from direct and indirect cross-contamination via one or more mechanical components including the shroud 900, SCU 1000, and lockable capsule lid (LCL) 1100 during transit to and between sampling locations and a home base. An MLSC system 100 device is retrofitted or attached to an aerial drone 102 of choice through a drone platform-specific drone attachment 104.

Figure 2:
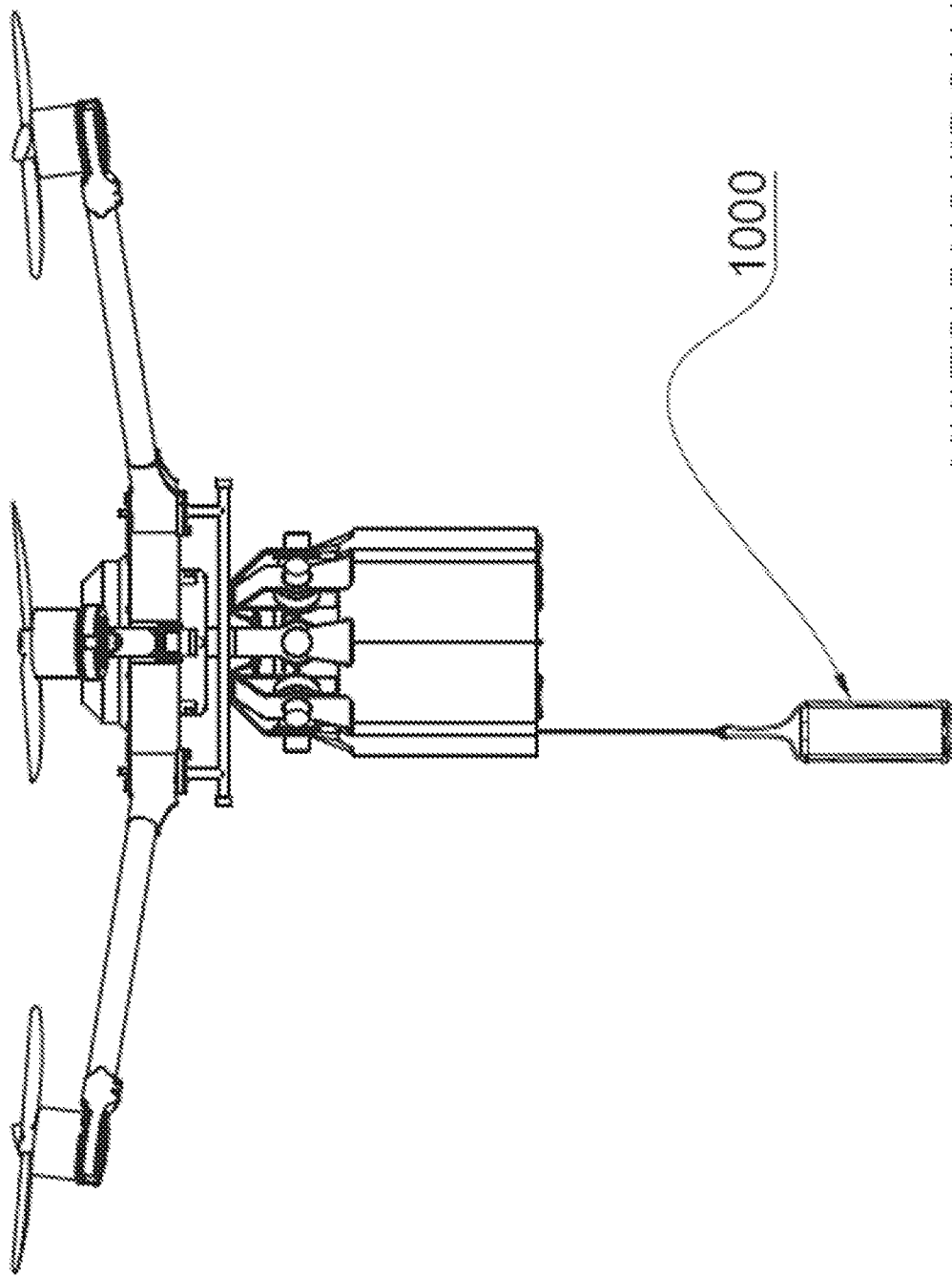
FIG. 2 is an illustrative representation of the multiple liquid sample capture (MLSC) system as shown in FIG. 1 in a sampling state with one end effector, such as a sample capture unit (SCU) 1000 or sensor package deployed for execution of liquid collection or liquid characterization process.

FIG. 2. is an illustrative representation of the multiple liquid sample capture (MLSC) system 100 as shown in FIG. 1 in a sampling state with one sample capture unit (SCU) 1000 or end effector released from the protection of the shroud 900, lockable capsule lid (LCL) 1100 disarmed with flow doors 1002 open, the drive system 800 engaged and driving the sprung winch spool (SWS) 700 to lower the SCU 1000 or end effector toward the target liquid surface. The SWS 700 is driven in the opposite direction to recover the SCU 1000 following passive liquid capture through submersion with the LCL 1100 rearmed with doors closed when the lid returns to the docking point 502. The sample capture process for a given location and time is concluded when the shroud 900 is returned to protect the SCU 1000 or end effector subsystem from cross-contamination during subsequent transit between sampling locations and a home base.

Figure 3:
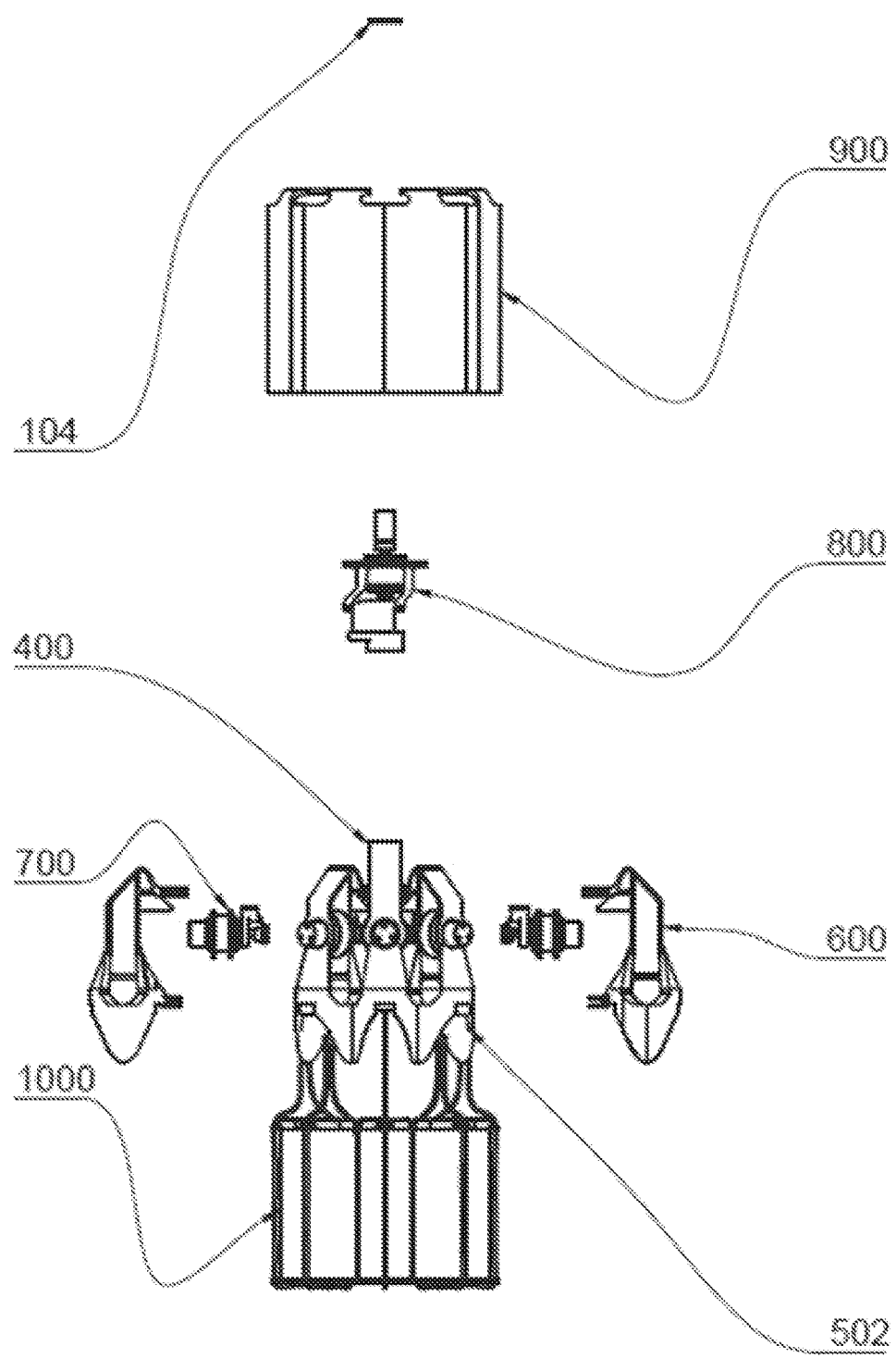
FIG. 3 is an illustrative exploded representation of the multiple liquid sample capture (MLSC) retrofit system of FIGS. 1-2.

FIG. 3 is an illustrative exploded representation of the multiple liquid sample capture (MLSC) system 100 to more effectively present the drive system 800, drone attachment 104 and docking point 502 that are not readily visible in the non-exploded system representation views presented in FIG.

1 and FIG. 2. Assembly of the modular MLSC system 100 generally includes the attachment of the drive system 800 to the core 400 for all possible configurations. Detachable docks 600 are then attached to the core 400 consistent with the use case and payload limitations of the aerial drone 102 platform. Sprung winch spools (SWS) 700 are then attached to the dock 500 and detachable docks 600 present before sample capture units (SCU) 1000 and shrouds 900 are added to complete the system. The MLSC retrofit system 100 is affixed to the aerial drone 102 at drone attachment 104.

Figure 4:
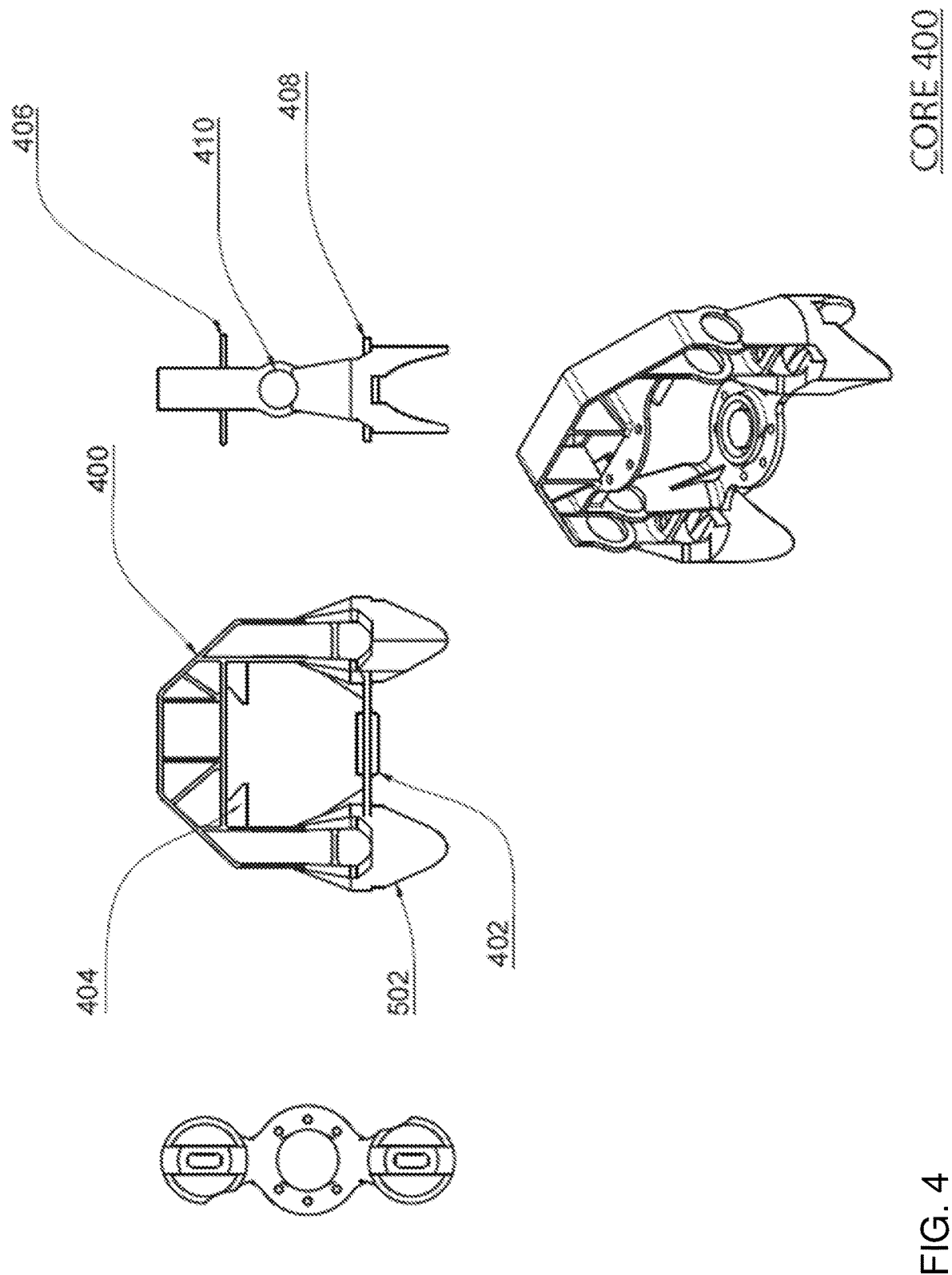
FIG. 4 is an illustrative representation of core central functional structure of the multiple liquid sample capture (MLSC) system of FIGS. 1-3 that includes mechanical attachment points for auxiliary subsystems.

FIG. 4 is an illustrative representation of the core 400 of the multiple liquid sample capture (MLSC) system 100. The core 400 resists all foreseeable static and dynamic forces of the system given its intended application and is mechanically attached to the aerial drone 102 via the drone attachment 104. The core also acts as a mechanical hub for the system wherein auxiliary components such as detachable docks 600 can be attached to achieve complete MLSC system 100 assembly consistent with the use case and payload limitations of the aerial drone 102 platform.

FIG. 5 is an illustrative representation of the dock 500, a component built directly into the multiple liquid sample capture (MLSC) system 100 and core 400 presented in FIG. 4 which provides a mechanical holster for the initial individual or pair of sample capture units (SCU) 1000 or end effectors. This dock holds SCUs 1000 or end effectors present securely in place at the docking point 502 at all times except when they are being deployed including during aerial drone 102 transit to and between sampling locations and a home base.

Figure 6:
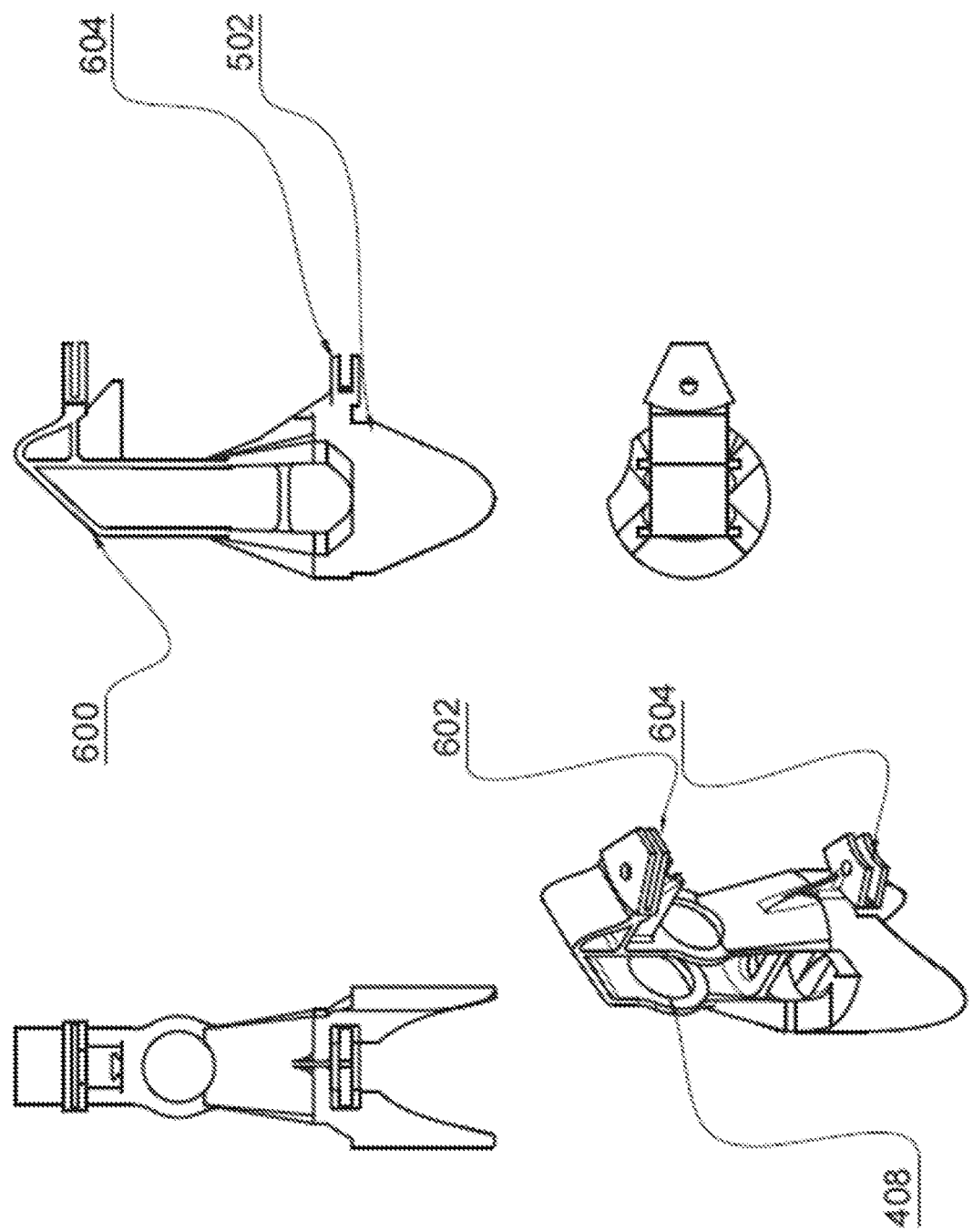
FIG. 6 is an illustrative representation of a detachable dock similar to the dock of FIG. 5 but with a mechanical architecture that includes core attachment points (CAP) for ease of attachment and detachment.

FIG. 6 is an illustrative representation of the detachable dock 600 which assumes a role identical to the dock 500. However, it includes a mechanical architecture such as a core attachment point (CAP), shown as components 602 and 604, that make it easily attachable and detachable from the core 400 and therefore the multiple liquid sample capture (MLSC) system 100. This detachability incorporates modularity into the MLSC system 100 and enables it to be readily configured with any number of sample capture units (SCU) 1000 or end effectors as a function of the number of available detachable docks 600, CAPs, and payload limitations associated with the aerial drone 102 platform. One or more detachable docks 600 can be added to the system to expand the number of discrete samples to be captured or the sample capacity of the device to align with the use case. The dock 500 and detachable dock 600 and their respective elements support the actuation, lowering and/or raising, of the SCU 1000 or end effectors at sample sites and provide mechanical support to the SCUs 1000 or end effectors during transit between sampling locations and a home base.

Figure 7:
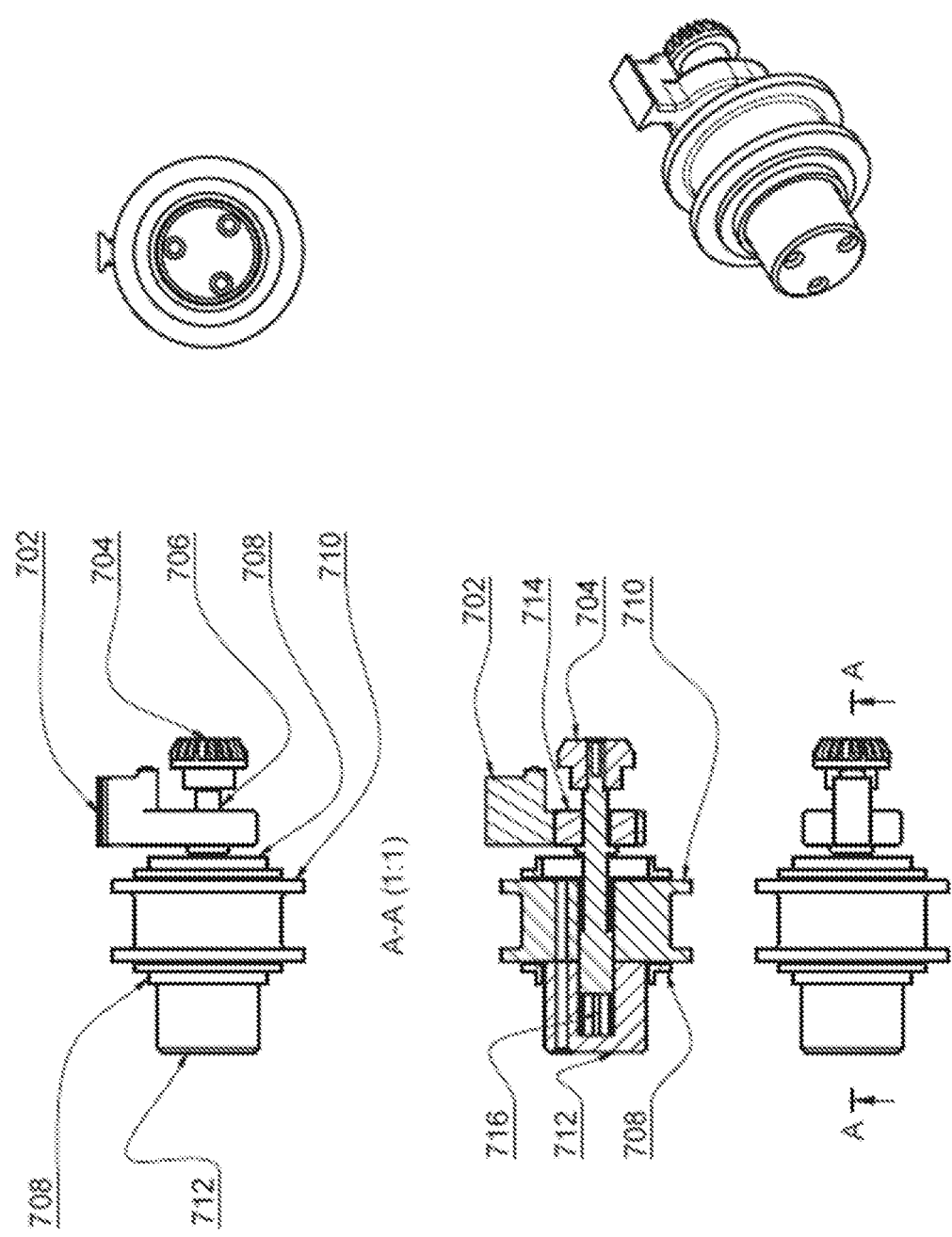
FIG. 7 is an illustrative representation of sprung winch spool (SWS) controlled in rotation by a drive gear for raising and lowering of the sample capture units (SCU) or end effectors to access a liquid of interest.

FIG. 7 is an illustrative representation of the sprung winch spool (SWS) 700, a system that enables the rotation of a spooled line or cable system to lower and/or raise the sample capture unit (SCU) 1000 or end effector to access the liquid of interest during deployment. The SWS 700 can exist in one of two states at any given time, rotate and lock, and can be sequenced by control of the drive system 800 detailed in FIG. 8. This feature is governed by the unidirectional sequential architecture of the drive system 800 that holds SCUs 1000 or end effectors within their docks 500 or detachable docks 600 at their docking points 502 and shrouds 900 when they are not deployed. This SCU 1000 configuration during multiple liquid sample capture (MLSC) system 100 transit state limits the potential for the unwanted ingress of a gas, liquid, or other environmental media during aerial drone deployment, transit, and recovery procedures. The SWS 700 is an advantageous part of the MLSC system 100 as it drives the armed/disarmed state change of the lockable capsule lid (LCL) 1100 and therefore the SCU 1000 or end effector shown in FIG. 10. When the drive system 800 presented in FIG. 8 sequences an SCU 1000 or end effector to begin deployment, the spring chamber 712 will extend the linear slide 702 to align drive gear 806 and driven gear 704. This gear alignment establishes a mechanical connection that allows for the rotation of the winch drum 710 enabled by rotational degree of freedom at the bearing 708 interface.

Figure 8:
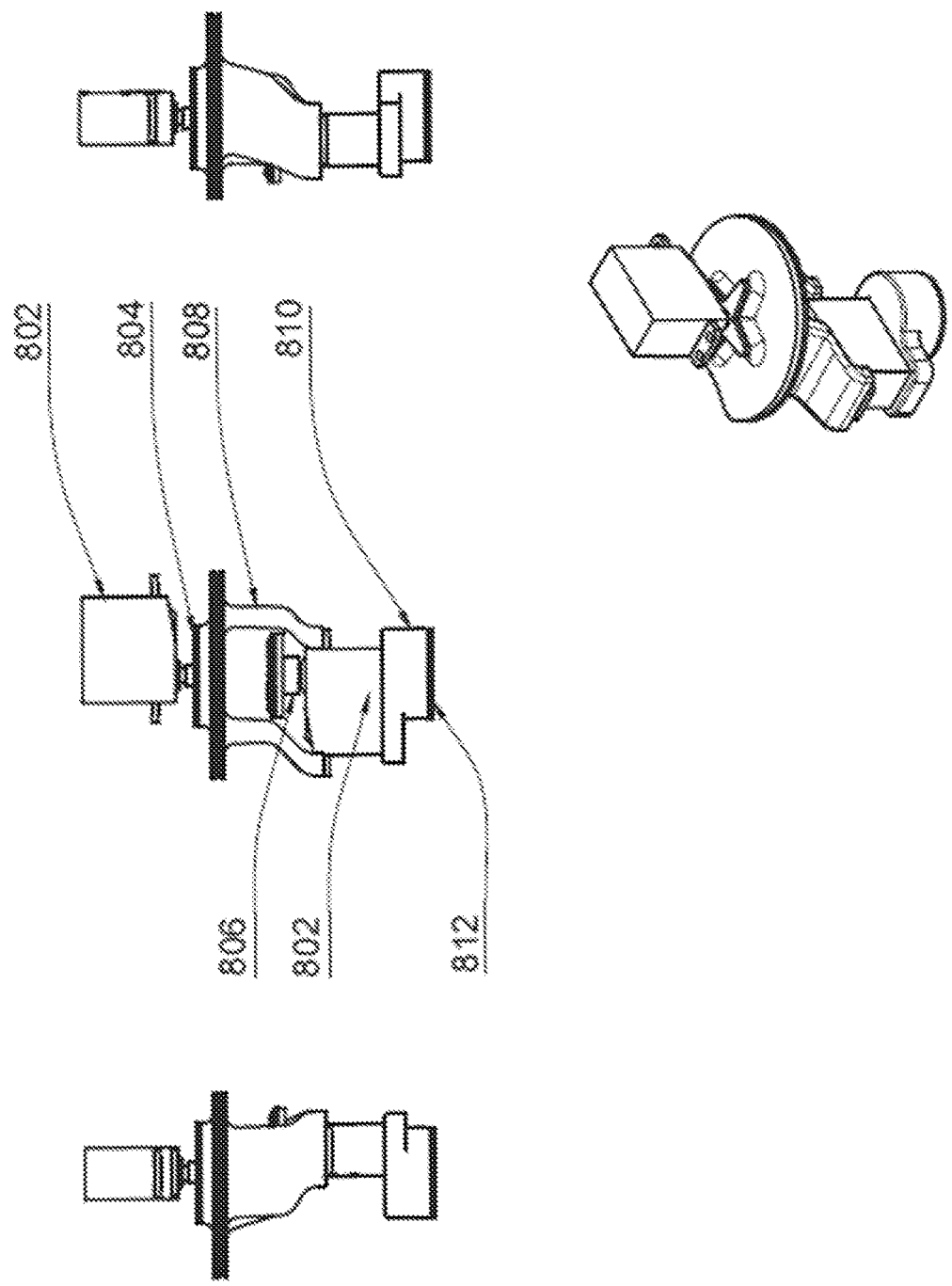
FIG. 8 is an illustrative representation of a drive system, central actuation mechanism or element for sample capture unit (SCU) 1000 or end effector activation and subsequent deployment and recovery.

FIG. 8 is an illustrative representation of drive system 800 which includes an upper motor 802 mechanically coupled via a motor mount 804 to cam bracket 808 to rotate the cam structure and the remaining drive system 800, lower motor 802, drive seat 810, and drive gear 806 on a rotational degree of freedom enabled by the drive seat bearing (DSB) 812. The sequenced rotation of drive system 800 around the aforementioned degree of freedom moves cam bracket 808 to a position that extends or compresses spring chamber 712. In between the temporal extension and compression of the spring chamber 712, while the spring is fully extended, the lower motor 802 powers drive gear 806 in a specifically designed power sequence to rotate the sprung winch spool (SWS) 700, lower and/or raise the sample capture unit (SCU) 1000 or end effector, and carry out the passive liquid capture sampling process.

Figure 9:
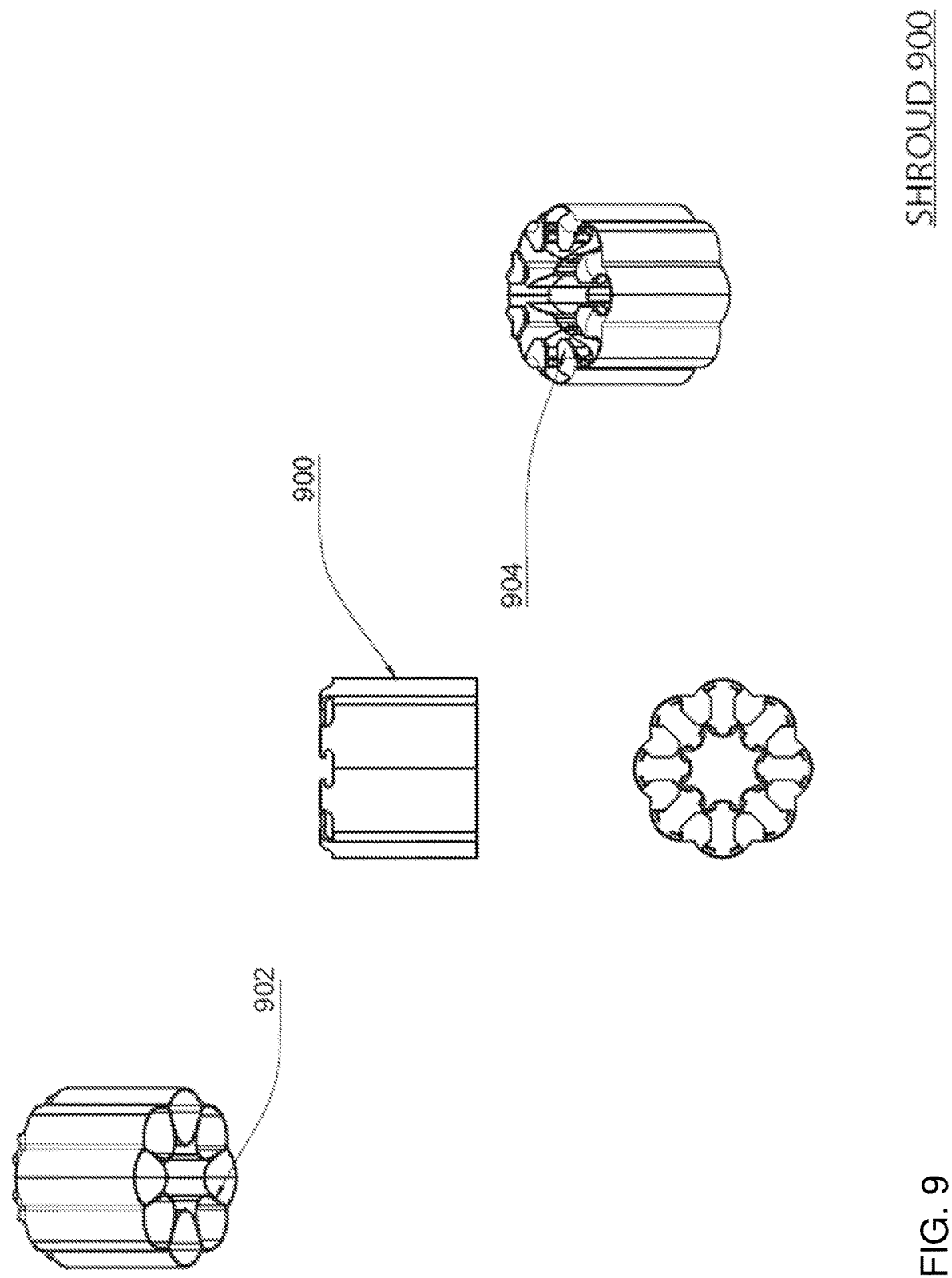
FIG. 9 is an illustrative representation of a shroud mechanical barrier between both individual sample capture units (SCU) or end effectors and other SCUs or end effectors and the surrounding environment.

FIG. 9 is an illustrative representation of the shroud 900, an external sample capture unit (SCU) 1000 enclosure to prevent the unwanted ingress of a gas, liquid, or other environmental media into receptacle 1106 during aerial drone 102 deployment, transit, and recovery procedures between sample locations or return to home base. The shroud 900 provides a mechanical barrier between both individual SCUs 1000 or end effectors and other SCUs 1000 or end effectors and the surrounding environment. SCUs 1000 or end effectors are held securely in place at the docking point 502 and covered by the shroud 900 at all times unless they are deployed to sampling position as shown in FIG. 2. The shroud 900 is modular and can be added or removed from the multiple liquid sample capture (MLSC) system 100 for each SCU 900 or end effector via the mechanical shroud attachment 904 to meet the needs of additional use cases and address payload limitations of the aerial drone 102 platform.

Figure 10:
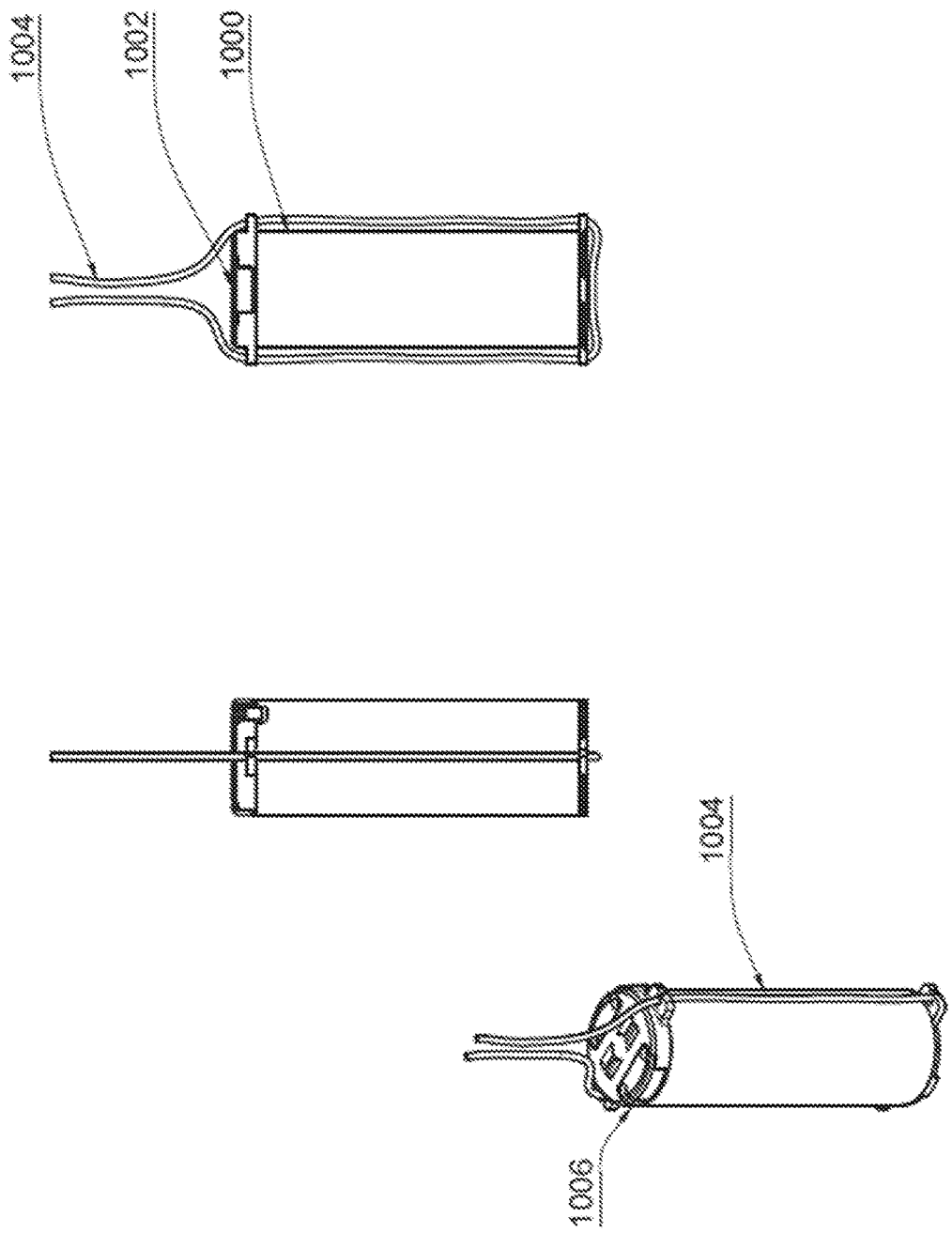
FIG. 10 is an illustrative representation of a sample capture unit (SCU) subsystem that is deployed from the multiple liquid sample capture (MLSC) system to passively capture liquid through submersion at a chosen sample site.

FIG. 10 is an illustrative representation of the sample capture unit (SCU) 1000 which is a passive, liquid sample receptacle subsystem that can be deployed from the multiple liquid sample capture (MLSC) system 100 to capture liquid at a chosen sample site while preventing the unwanted ingress of a gas, liquid, or other environmental media into receptacle 1106 during aerial drone deployment, transit, and recovery procedures between sample locations or return to home base. As indicated in the narrative descriptions for FIG. 4 and FIG. 5, the system is modular in nature allowing for the installation and removal of detachable docks 600, sprung winch spools (SWS) 700, and SCUs 1000 consistent with the application of the system and payload limitations of the aerial drone 102 platform. The SCU 1000 can be readily replaced with one or more end effectors such as generic liquid sampling structures, sensors, or sensor packages (e.g., nitrate, nitrites, ammonia, pH, temperature, chlorophyll, microbial DNA densities, microplastics, dissolved oxygen, turbidity, chlorine, spectral analysis, etc.) via attachment by cable 1004.

Figure 11:
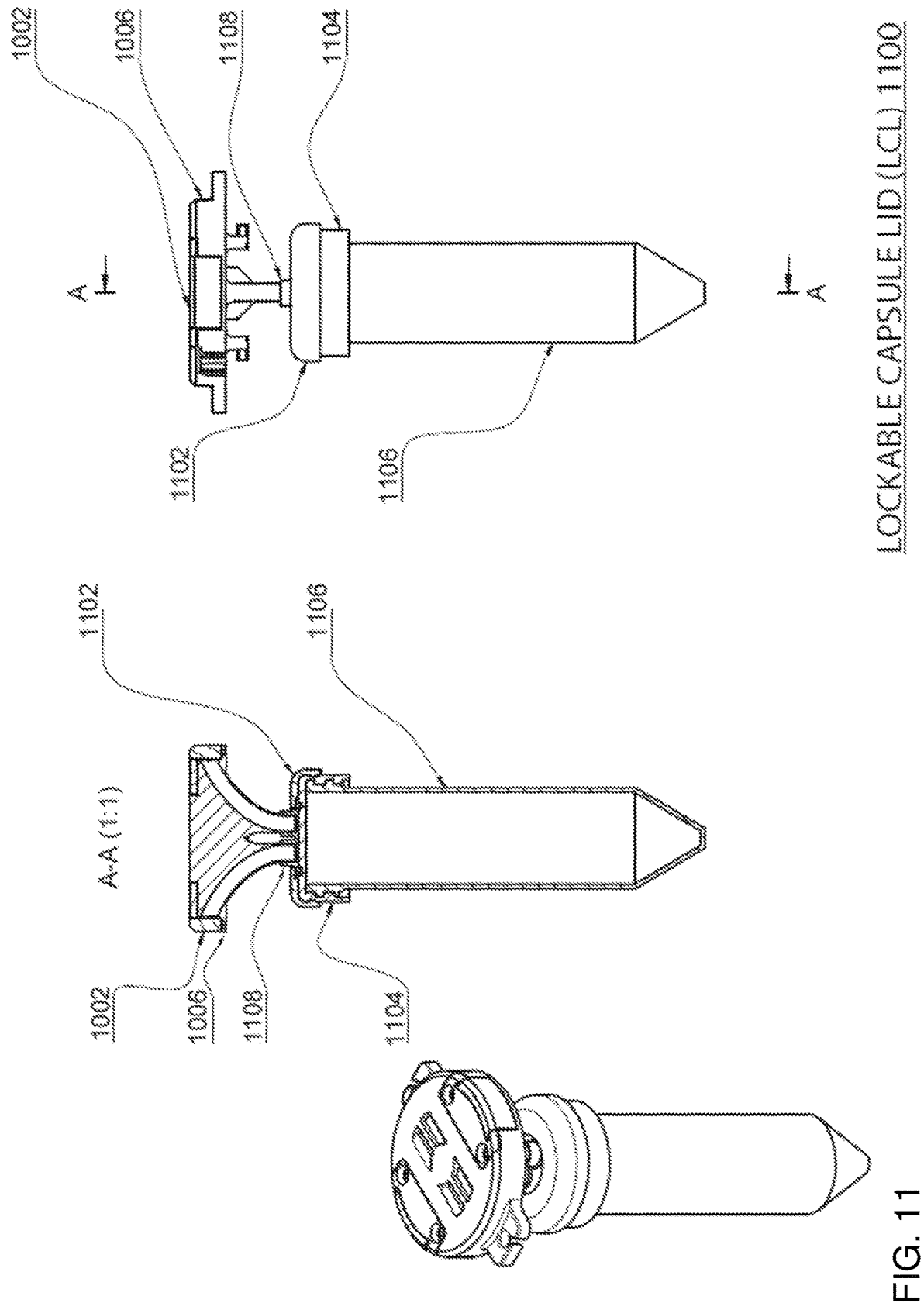
FIG. 11 is an illustrative representation of a lockable capsule lid (LCL) subassembly of the sample capture unit (SCU) to isolate a sample receptacle from cross-contamination.

FIG. 11 is an illustrative representation of the lockable capsule lid (LCL) 1100, an advantageous subassembly of the sample capture unit (SCU) 1000 including two mechanisms to isolate receptacle 1106 from cross-contamination and prevent the unwanted ingress of a gas, liquid, or other environmental media into during aerial drone 102 deployment, transit, and recovery procedures. The first mechanism includes a lid 1006 that can be set to either an armed or unarmed position through rotation. The armed position corresponds with open cap orifices allowing for the ingress and egress of gases liquids while the unarmed position corresponds to a closed position mechanically isolating receptacle 1106. The unarmed setting is analogous to a closed standard cap and is expected to be used during SCU 1000 assembly and preparation or post-sampling prior to liquid processing. The second mechanism to isolate the sample receptacle within the LCL 1100 subassembly are the flow doors 1002. These flow doors 1002 are closed when the LCL 1100 and broader SCU 1000 are docked to the aerial drone 102 at the docking point 502. The LCL 1100 is transitioned to sampling state when the drive system 800 initiates deployment, the SWS 700 is engaged, and the flow doors 1002 are opened as the SCU 1000 is initially lowered toward the liquid of interest consistent with the sample state shown in FIG. 2. Liquid is allowed to fill the sample receptacle 1106 through open flow doors 1002 and sample receptacle cap (SRC) 1104 when the SCU 1000 is submerged. The flow doors 1002 are subsequently closed upon SCU 1000 recovery and return to the docking point 502 effectively sealing the SRC 1104 and the liquid sample within the receptacle 1106.

It is to be understood that the method and system of the illustrative embodiments are for illustrative purposes, as many variations of the specific hardware used to implement the illustrative embodiments are possible, as will be appreciated by those skilled in the relevant art(s). The functionality of one or more of the components of the illustrative embodiments can be implemented via similar designs. For example, the above-described method and system of the illustrative embodiments can include any number of discrete sample receptacles made of any material, shape, or size deployed or actuated by any trigger mechanism.

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A system for capture of multiple liquid samples from an aerial drone, the system comprising:
   an aerial drone;
   a plurality of liquid sample receptacles, each liquid sample receptacle disposed within a respective receptacle-containing unit, each receptacle-containing unit including a lid and capsule assembly having flow doors and the lid serving as orifice covers;
   a gear drive mechanism comprising a drive system including a gear and a cam bracket, the gear drive mechanism removably attached to the aerial drone;
   one or more docks coupled to the gear drive mechanism and configured to hold the respective receptacle-containing units;
   a sprung winch spool and a cable coupled to each receptacle-containing unit, the sprung winch spool configured to independently lower and raise the respective receptacle-containing unit into a body of liquid to capture a liquid sample;
   a shroud covering the receptacle-containing units when the receptacle-containing units are held at a docking point within the one or more docks, the shroud forming a mechanical barrier between individual receptacle-containing units and between the receptacle-containing units and a surrounding environment;
   wherein the system is configured such that the receptacle-containing units are deployed from the one or more docks via the gear drive mechanism, the sprung winch spool, and the cable at desired sampling locations and sampling times, and upon retrieval the receptacle-containing units are returned to the shroud and the flow doors and the lid are closed to prevent cross-contamination of collected samples during transit to and between sampling locations and a home base.

2. The system of claim 1, wherein the shroud in combination with the capsule assembly, including the flow doors and the lid, are configured to provide multi-layered protection against cross-contamination.

3. The system of claim 1, wherein the shroud in combination with the lid and the capsule assembly, including the flow doors and the lid, are configured to prevent unwanted ingress of liquids or gases into the respective liquid sample receptacles.

4. The system of claim 1, wherein the flow doors and the lid are configured to operate to seal the liquid sample receptacles during non-deployment and to reopen only when the liquid sample receptacles are lowered for sampling.

5. The system of claim 1, further comprising:
   one or more sensors or sensor packages coupled to the aerial drone by the cable and configured to collect environmental or sampling data.

6. A method for capture of multiple liquid samples from an aerial drone, the method comprising:
   providing an aerial drone;
   providing a plurality of liquid sample receptacles, each liquid sample receptacle disposed within a respective receptacle-containing unit, each receptacle-containing unit including a lid and capsule assembly having flow doors and the lid serving as orifice covers;
   coupling a gear drive mechanism to the aerial drone, the gear drive mechanism comprising a drive system including a gear and a cam bracket, and one or more docks configured to hold the respective receptacle-containing units;
   coupling a sprung winch spool and a cable to each receptacle-containing unit;
   operating the gear drive mechanism and the sprung winch spool to lower the respective receptacle-containing unit from the one or more docks into a body of liquid to capture a liquid sample at a desired sampling location and sampling time;
   retrieving the receptacle-containing unit from the body of liquid by raising the receptacle-containing unit with the sprung winch spool and the cable;
   returning the receptacle-containing unit to the shroud while the shroud covers the receptacle-containing units held at a docking point within the one or more docks, the shroud forming a mechanical barrier between individual receptacle-containing units and between the receptacle-containing units and a surrounding environment; and
   closing the flow doors and the lid of the capsule assembly upon retrieval of the receptacle-containing unit to prevent cross-contamination of collected samples during transit to and between sampling locations and a home base.

7. The method of claim 6, further comprising:
   operating the shroud in combination with the capsule assembly, including the flow doors and the lid, to provide multi-layered protection against cross-contamination.

8. The method of claim 6, further comprising:
operating the shroud in combination with the lid and the capsule assembly, including the flow doors and the lid, to prevent unwanted ingress of liquids or gases into the respective liquid sample receptacles.

9. The method of claim 6, further comprising:
operating the flow doors and the lid to seal the liquid sample receptacles during non-deployment and to reopen only when the liquid sample receptacles are lowered for sampling.

10. The method of claim 6, further comprising:
operating one or more sensors or sensor packages coupled to the aerial drone by the cable to collect environmental or sampling data.

\* \* \* \* \*